United States Patent [19]

Hoffend et al.

[11] 4,314,931
[45] Feb. 9, 1982

[54] TONER PIGMENT TREATMENT PROCESS FOR REDUCING THE RESIDUAL STYRENE MONOMER CONCENTRATION TO LESS THAN 0.5 PERCENT BY WEIGHT

[75] Inventors: Thomas R. Hoffend, Webster, N.Y.; Moshe Levy, Rehovot, Israel

[73] Assignee: Xerox Corporation, Stamford, Conn.

[21] Appl. No.: 157,904

[22] Filed: Jun. 9, 1980

[51] Int. Cl.³ .......................... C08J 3/20; C08K 3/04
[52] U.S. Cl. ............................. 260/42.53; 260/42.52; 260/42.43; 252/511; 430/109; 430/137
[58] Field of Search .................... 260/42.53, 42.52; 430/109, 137

[56] References Cited

U.S. PATENT DOCUMENTS

| | | | |
|---|---|---|---|
| 2,892,794 | 6/1959 | Insalaco | 252/62.1 |
| 3,117,943 | 1/1964 | Cobiere et al. | 260/42.53 |
| 3,256,236 | 1/1966 | Herman et al. | 260/42.53 |
| 3,338,991 | 8/1967 | Insalaco et al. | 264/7 |
| 3,346,535 | 10/1967 | Dekring | 260/42.53 |
| 3,391,082 | 7/1968 | Maclay | 252/62.1 |
| 3,563,916 | 2/1971 | Takashima et al. | 260/42.53 |
| 3,623,986 | 11/1971 | Machida et al. | 252/62.1 |
| 3,629,117 | 12/1971 | Okuno | 260/42.53 |
| 3,639,243 | 2/1972 | Okuno et al. | 260/42.53 |
| 3,639,244 | 2/1972 | Machida et al. | 260/42.53 |
| 3,652,461 | 3/1972 | Dalton | 252/511 |
| 3,657,130 | 4/1972 | Machida et al. | 260/42.53 |
| 3,856,745 | 12/1974 | Yamaguchi et al. | 260/42.53 |
| 4,014,844 | 3/1977 | Vidal et al. | 260/42.53 |
| 4,033,890 | 7/1977 | Tamai et al. | 260/42.53 |
| 4,231,919 | 11/1980 | Isaacson | 430/137 |

OTHER PUBLICATIONS

4477y/03 Derwent Abst. ENOKI, 11-30-76, "Magnetic Toner . . . Carbon Black Powder".
Derwent 2588 X/02, "Mesocarbon Graft Copolymers . . . ", 5-24-75.
Derwent Abst. 40342 W/24 Lion Fat, "Carbon-Based Graft Copolymers", 5-27-75.

Primary Examiner—Herbert J. Lilling
Attorney, Agent, or Firm—E. O. Palazzo

[57] ABSTRACT

This invention relates to a process for substantially eliminating polymerization inhibition in a pigment containing dispersion polymerization reaction, which comprises grafting polymer molecules onto the pigment used in the polymerization reaction, whereby there results a polymerized product which contains essentially no monomer material.

4 Claims, No Drawings

TONER PIGMENT TREATMENT PROCESS FOR REDUCING THE RESIDUAL STYRENE MONOMER CONCENTRATION TO LESS THAN 0.5 PERCENT BY WEIGHT

BACKGROUND OF THE INVENTION

This invention relates to processes for preparing improved toners, and developers, and more specifically to the treatment or grafting of pigments used in toners, which treatment aids in preventing the inhibition of the polymerization reaction, while at the same time maintaining the dispersibility of the pigment in the monomer used for making the toner resin.

The formation and development of images on the surface of photoconductive surfaces is well-known as documented in many prior art patents, including U.S. Pat. No. 2,297,691. The latent image formed on the photoreceptor is usually developed by applying electroscopic or toner materials to the surface of the photoreceptor. This can be followed by the transfer of the developed latent image to a suitable substrate and optionally, permanently affixing the transferred image to the substrate. Many methods are known for applying the toner particles to the latent electrostatic image including cascade development, as described in U.S. Pat. No. 2,618,552, magnetic brush development as described in U.S. Pat. No. 2,874,063, powder cloud development as described in U.S. Pat. No. 2,221,776, touchdown development as described in U.S. Pat. No. 3,166,432 and the like.

Toners have generally been prepared for example by thoroughly mixing the softened resin and pigment, thereby resulting in a uniform dispersion, by blending these ingredients in a rubber mill and then pulverizing to thereby result in the formation of small particles. The division of the resin pigment dispersions has been accomplished by jet pulverization of the material, and although this technique of toner manufacture has produced very excellent toners, it does tend to have certain disadvantages, including for example it generally produces a rather wide range of particle sizes of toner particles. Although the average particle size of toner made according to this technique generally ranges between about 5 and about 10 microns, individual particles ranging from submicron in size to above 20 microns are not infrequently produced. Additionally, this is a batch process which tends to be slow, expensive and dusty. Further, this technique of toner production imposes certain limitations upon the materials selected for the toner, as the resin pigment dispersion must be sufficiently friable in order that it may be pulverized at a economically attractable rate of production. One of the problems which arises from this requirement is that the resin pigment dispersion while being sufficiently friable for high speed pulverizing tends to form an even wider range of particle sizes during pulverization, including a relatively large percentage of dust or toner fines. Such highly friable materials are frequency subject to further pulverization or powdering, when for example they are employed as developers in xerographic copying systems. Many of the other requirements for electrophotographic developers or toners, including the requirements that they be stable in storage, non-agglomerative, possess the proper triboelectric properties for development, form good images, do not film or soil the photoconductive plate and have a low melting point for heat fusing, are only compounded by the additional requirements imposed by the above-mentioned toner forming process.

Another method of forming toner is the co-called spray drying technique wherein there is blended a water latex of the desired toner resin with a colorant, followed by spray drying the mixture to the desired particle size. The spray drying consists essentially of atomizing the colorant water latex blend into small droplets, mixing these with a gas and holding the droplets in suspension in the gas until surface tension forces cause the resin particles in each droplet to coalesce, thus encasing the colorant in that droplet. Spray dryed toners are not totally satisfactory as it is difficult to completely remove all the solvent, and the solvent which remains in the toner particles acts to affect adversely triboelectric properties between the toner and carrier, and contributes to the blocking of the toner when such is used in developing processes.

There is described in United Kingdom Patent Publication No. 1,319,815 a process for preparing toners directly from monomers by polymerization of the monomer in toner sized particles containing a colorant. A method of suspension polymerization to form toner particles is disclosed in U.S. Pat. No. 3,634,251. In the method as described in the British Patent there is prepared a kneaded oil phase component made up of one or more liquid resin monomers, coloring material, the polymerization initiator and a finely-divided inorganic dispersion stabilizer, such as a metal powder or inorganic salt or oxide, and a polar resinous additive which is soluble in a monomer. Subsequent to suspension polymerization of the monomer, if required, the finely-divided dispersion stabilizer is removed by dissolution in an acid, and the polymer particles are removed from the aqueous phase and dryed to produce toner. There are some disadvantages associated with this process, including the requirement of a high ratio of inorganic stabilizer, which needs to be removed as it will affect the properties of the toner, and thus the quality of the resulting image to be developed. A further disadvantage of such a process is that it results in incomplete polymerization of the monomer, which adversely affects the triboelectric properties, blocking properties, and fixing properties of the resulting toner.

There has been proposed a suspension polymerization process similar to the one mentioned above with respect to the British Patent but wherein the use of an inorganic stabilizer is eliminated. Generally this process is accomplished by mixing a monomer, a colorant, and an initiator to form an oil soluble organic phase, dispersing this oil soluble phase in a controlled size, of between 5 to about 20 microns in a water phase, employing a suspending agent such as polyvinyl alcohol, polymerizing, employing conventional suspension polymerization techniques, followed by introduction of a second monomer which is allowed to diffuse into the first polymer, and consequently swells the polymer; introducing a water soluble initiator, and heating this reaction mixture to effect a polymerization of the second monomer and to form the toner. The second initiator or water soluble initiator generates a free radical which attracts the surface of the swollen polymer particle and promotes polymerization at the surface by reacting with monomer at the surface thereby decreasing the monomer concentration and causing the transport of monomer to the surface by diffusion. While this process may be used to produce encapsulated toners, it does not provide an acceptable method for producing toners which are not encapsulated, and which may withstand the abrasion, stress and humidity variation to which toners are subjected to in ordinary electrophotographic development systems.

There continues to be a need for a process for preparing toners which would not involve some of the above disadvantages, including extensive processing of the polymer, colorant addition, mixing and particle formation. There is also a need for processes which would produce toner particles directly from monomer, which toner particles will have excellent triboelectric properties, abrasive resistance, blocking resistance and colorant loading capability. More importantly, there is also a need for the development of processes for preparing toners whereby the retardation-inhibition effects of pigments, such as carbon blacks, which are used in such processes, on the free radical polymerization of certain monomers can be prevented, while the dispersion of the pigment in the polymer formed during the polymerization is maintained.

SUMMARY OF THE INVENTION

It is therefore an object of this invention to provide a toner which overcomes the above-noted disadvantages.

A further object of the present invention is to provide a process for producing toner that has very little monomer remaining after the polymerization reaction.

It is another object of this invention to provide a process for preparing toners, whereby the retardation inhibition effects of pigments particularly carbon blacks, on the free radical polymerization of certain monomers such as vinyl monomers, can be prevented by the grafting of polymers on the pigments, while a dispersion of the pigment in the polymer formed during the polymerization is maintained.

Another object of the present invention is to provide a process for preparing toners at a low cost.

These and other objects of the present invention are accomplished generally by providing processes, which involve the grafting or attachment of polymer molecules onto the surface of colorants or pigments used for preparing toners, whereby the colorant or pigment is isolated from the polymerizing reaction. The grafting or attachment of polymer materials onto the pigment surface substantially eliminates any inhibiting effect the pigment alone (untreated) has on the polymerization reaction. Thus, for example, when toner is being prepared using a dispersion polymerization reaction, well known in the art, an untreated pigment, such as carbon black, inhibits polymerization of the monomer, and such inhibition results in a monomer-polymer mixture containing greater than 0.5 weight percent of monomer as a result of incomplete polymerization. This mixture would not be suitable for use as a toner resin since a monomer content of greater than 0.5 percent results in plasticization, objectionable odor problems, especially in high speed copier-duplicator devices; and the like. The grafting of polymers onto the colorant and pigment surfaces, tends to neutralize the active sites on the pigment surface, which neutralization allows the monomer to be substantially completely polymerized in a dispersion polymerization reaction.

Numerous polymer molecules can be grafted or attached to the pigment surface, providing that such polymers accomplish the objectives of the present invention, that is, for example, become permanently bonded to the colorant or pigment. The polymer molecules used can be similar to the polymeric materials used as the toner resin as more specifically defined hereinafter. Illustrative examples of polymer molecules include polystyrene, copolymers of styrenes with alkyl methacrylates, such as methyl, ethyl, butyl hexyl, 2-ethyl hexyl; and the like. The amount of polymer molecules contained on the pigment surface can in one embodiment be less than 50 percent by weight, and preferably less than 20 percent by weight. In one preferred embodiment of the present invention less than 10 percent by weight of polymer molecules are grafted on the pigment. The pigments can be completely coated, that is, the entire pigment particles contain a coating of the polymer molecules, or the pigments can be partially coated. The degree of coating is dependent on the nature of the polymer molecules, the pigment materials, the polymers used as the toner resin, and the like.

The grafted pigment formation process of the present invention can be accomplished as described in the prior art, reference U.S. Pat. Nos. 3,117,943, and 3,563,916, the disclosure of both these patents being totally incorporated herein by reference. In one method the grafting is accomplished by adding from about 1 to about 80 weight percent of colorant or pigment, and preferably 40 to 60 weight percent of pigment with mixing, to about 20 to 99 percent by weight of monomeric material containing from about 0.5 to about 20 weight percent of free radical initiator based on the weight of monomers used. The pigment monomer initiator blend is then heated to an appropriate temperature, for example from about 50° to about 120° C. for the purpose of decomposing the initiator, and also for the purpose of beginning polymerization of the monomer. Stirring of the resulting mixture is then accomplished, using for example a paddle blade stirrer or dough mixer, and depending on the properties desired in the final toner product as well as for the convenience of operation, the grafting polymerization reaction may be either effected to complete conversion or stopped at an intermediate conversion. In general the degree of grafting tends to increase with polymerization time, however, the elimination of the retardation inhibition activity of the pigment was not necessarily optimized by merely increased amounts of grafted polymer on the pigment. Rather a decrease in the reactivity of the pigment was most efficiently achieved by combination of the amount of polymer grafted on the pigment, and the length of the grafted polymer chains, as well as the concentration of the initiator used and the like.

Any polymeric toner resin material, which may be formed by dispersion polymerization and which has rheological properties within the range suitable for use as a toner may be used in the toner forming process of the instant invention. Typical monomeric units which may be employed to form toner resin polymers include: styrene, p-chlorostyrene; vinyl naphthalene; vinyl esters such as vinyl acetate, vinyl propionate, vinyl benzoate, vinyl butyrate and the like; esters of alphamethylene aliphatic monocarboxylic acids such as methyl acrylate, ethyl acrylate, n-butylacrylate, isobutyl acrylate, dodecyl acrylate, n-octyl acrylate, 2-chloroethyl acrylate, phenyl acrylate, methyl-alpha-chloroacrylate, methyl methacrylate, ethyl methacrylate, butyl methacrylate and the like; acrylonitrile, methacrylonitrile, vinylidene chloride; and mixtures thereof. Generally, suitable vinyl resins employed have a weight average molecular weight between about 15,000 to about 500,000.

Pigments that may be treated in accordance with the present invention include various carbon blacks such as commercially available materials including Raven 420 carbon black, Regal 330 carbon black, and the like. These treated carbon blacks substantially eliminate inhibiting effects untreated carbon blacks have on the polymerization reaction.

Illustrative examples of free radical initiators that may be used in the polymer to carbon black grafting process of the present invention include 2,2'-Azobis(2-methyl propionitrile) (AIBN); 2,2'-Azobis(2,4-dimethylvaleronitrile); 2-t-butylazo-2-cyano-4-methyl pentane, 2-t-butylazo-2-cyanopropane, and the like.

Any suitable carrier may be used with the toner of the present invention to form a developer. Suitable coated and uncoated carrier materials for cascade and magnetic brush development are well known in the art. The carrier particles may be electrically conductive, insulating, magnetic or non-magnetic provided that the carrier particles acquire a charge having an opposite polarity to that of the toner particles when brought into close contact with the toner particles so that the toner particles adhere to and surround the carrier particles. When a positive reproduction of an electrostatic image is desired, the carrier particles is selected so that the toner particles acquire a charge having a polarity opposite to that of the electrostatic latent image. Alternatively, if a reversal reproduction of the electrostatic image is desired, the carriers are selected so that the toner particles acquire a charge having the same polarity as that of the electrostatic image. Thus, the materials for the carrier particles are selected in accordance with their triboelectric properties in respect to the electroscopic toner so that when mixed or brought into mutual contact, one component of the developer is charged positively if the other component is below the first component in the triboelectric series and negatively if the other component is above the first component in the triboelectric series. Typical carriers include sodium chloride, ammonium chloride, aluminum potassium chloride, Rochelle salt, sodium nitrate, aluminum nitrate, potassium chlorate, granular zircon, granular silicon, methyl methacrylate, glass, steel, nickel, iron, ferrites, ferromagnetic materials, silicon dioxide and the like. The carriers may be employed with or without a coating. Many of the foregoing and other typical carriers are described by L. E. Walkup in U.S. Pat. No. 2,618,551; L. E. Walkup et al in U.S. Pat. No. 2,638,416; E. N. Wise in U.S. Pat. No. 2,618,552; R. J. Hagenbach et al in U.S. Pat. No. 3,591,503 and U.S. Pat. No. 3,533,835; and B. J. Jacknow et al in U.S. Pat. No. 3,526,533. Typical carrier coatings include fluorocarbon polymers, such as polyvinylidene fluoride, and the like. Specific suitable carriers for use with the toners of the present invention include nickel berry carriers, coated ferrite carriers, methyl terpolymer coated steel carriers, polyvinylidene fluoride coated carriers and the like. Nickel berry is a nodular nickel particle disclosed in U.S. Pat. No. 3,767,568 having a pebbled surface. Methyl terpolymer coated steel carrier is a steel core coated with a composition such as that of Example XIII of U.S. Pat. No. 3,526,533.

The invention will now be described in detail with respect to preferred embodiments thereof, it being understood that these examples are intended to be illustrative only, and the invention is not intended to be limited to the materials, conditions, process parameters and the like recited herein. All parts and percentages are by weight unless otherwise indicated.

EXAMPLE I

Grafting of polystyrene on carbon black and use of the resulting material in dispersion polymerization.

In a 250 ml. flask, equipped with a Heller stirrer (Teflon blade), and Argon gas inlet, a condenser, and a thermometer, which flask is mounted above an oil bath heated by a magnetic stirrer-hot plate, there was added 1 to 4 weight percent based on the weight of the monomer of 2,2'-azobis(2-methyl propionitrile (AIBN), followed by the addition of 120 grams of a styrene monomer. The reaction flask was stirred for about 20 minutes after which cooling water in the condenser was turned on. After about 20 minutes of gentle stirring at 22° to 23° C., the AIBN was essentially dissolved in the monomer resulting in a slightly hazy solution at 23° C.

Subsequently, 60 grams of carbon black was added slowly to the above solution, monomer-AIBN, with sufficient stirring to incorporate the carbon black into the liquid. The reaction mixture increased considerably in viscosity as the carbon black content increased, such mixture becoming a rather slushy looking mixture as visually observed at the conclusion of the carbon black addition.

This reaction mixture was stirred at 23° C. for 20 to 30 minutes and after stirring for another 20 minutes at 23° to 26° C., the flask containing this mixture was immersed into a heating bath having a temperature of 75° C.

When the reaction mixture reached a temperature of about 50° to 60° C., a significant decrease in viscosity was noted, and after about 40 minutes in the heating bath, the reaction mixture reached a desired polymerization temperature of 75° C., whereby it became very fluid. The mixture remained fluid for about 1 to 2 hours after the heating was initiated, whereupon the viscosity increased at first slowly and then very rapidly. During the most fluid stage of the reaction, the stirring rate was decreased to prevent vigorous splashing of the reactants in the flask. Once the viscosity increased to a point where stirring became difficult, the reaction mixture was poured into a stainless steel beaker. The reaction was terminated before 100 percent of the monomer was converted to polymer.

There resulted a carbon black pigment which had grafted thereon polystyrene.

In order to determine the amount of polystyrene grafted onto the carbon black, about a ½ gram sample from the above reaction mixture was weighed accurately into a 250 milliliter flask. Fifty (50) milliliters of chloroform was added to the flask, and the reaction sample was dispersed in the chloroform with hand shaking. The chloroform reaction mixture was filtered through a 0.22 micron filter, and the sample remaining on the filter was then washed at room temperature with 4 to 6, 20 milliliter aliquots of chloroform until no more solids were found on the evaporation of a drop of the filtrate. The washed carbon black which was dried to a constant weight in a vacuum at 42° C., was subjected to pyrolytic analysis in order to determine the percent of polystyrene grafted on the carbon black.

The percent polystyrene grafted on the carbon black was calculated by dividing the weight of non-soluble polymer by the weight of carbon black, multiplied by 100; and this amounted to approximately 3.3 weight percent.

Dispersion polymerization was carried out to determine the affect of grafting polymers on the carbon black, on the polymerization reaction. The process involves preparation of organic and aqueous phases, emulsification of the organic phase in the aqueous phase, polymerization, and recovery. The details of the formation of these various phases are as follows:

(1) Preparation of Organic and Aqueous Phases a. Aqueous Phase

A 5 percent by weight solution of Monsanto 20-60 polyvinyl alcohol (PVA) was prepared at 50° C. using distilled water and a magnetic stirrer hot plate. The PVA was added slowly (incrementally) to the hot, vigorously stirred water, and dissolved over the period of a day. This 5 percent PVA solution was stored in a polyethylene bottle at 5° C. A 0.5 percent solution of PVA was prepared by diluting 50 milliliters of the 5 percent solution with 450 milliliters of distilled water. The 0.5 percent solution was refrigerated overnight at 5° C.

b. Organic Phase

A 32 ounce wide mouth polyethylene bottle was rinsed twice with acetone and well dried. Styrene and n-butyl methacrylate monomers and the initiator (benzoyl or lauroyl peroxide) were weighed into the bottle. The bottle was hand-shaken for ten minutes to dissolve the initiator. The carbon black (if used) was then added to the initiator monomer solution. The carbon black mixture was hand-shaken (for approximately two minutes) and then placed on the mechanical shaker at a low setting overnight. Inhibitor free styrene and n-butyl methacrylate monomers were used. Thus the inhibitor tertiary butyl catechol (TBC) was removed from the styrene monomer by elution through neutral Woelm aluminum oxide, and the inhibitor monomethyl ether of hydroquinone (MEHQ) was removed from the n-butyl methacrylate monomer by elution through an Amberlyst A-27 ion exchange resin. Care was taken to use enough aluminum oxide or Amberlyst A-27 to prevent elution of the inhibitors from the elution column.

The amount of styrene used in the polymerization was 58 grams minus the amount of styrene monomer and polymer added as part of the grafted carbon black. The amount of styrene components (grafted and ungrafted polystyrene and styrene monomer) added to the co-monomers with the carbon black addition was determined as follows:

$$\left( \frac{\text{Styrene weight (grams)}}{\text{AIBN + styrene + Raven 420}^*} \right) \times$$
(all weight in grams)

$$\left( \begin{array}{l} \text{Total weight of grafted} \\ \text{carbon black used in} \\ \text{dispersion polymerization} \end{array} \right) =$$

amount of styrene components added to the co-monomers with the grafted carbon black.

*amounts used in the grafting process

Forty-two grams of n-butyl methacylate monomer was used, resulting in a 58/42 (58 percent styrene, 42 percent n-butyl methacrylate) by weight styrene/n-butyl methacrylate copolymer composition.

Benzoyl peroxide (BPO) and lauroyl peroxide (LPO) initiators were used at three and seven weight percent respectively, based on the total comonomer weight used (i.e., on the added monomers and the residual monomer accompanying the grafted carbon black).

Carbon black was added to the monomers so that seven grams of Raven 420 carbon black was used for every 100 grams of monomer/polymer employed. The amount of carbon black mixture used was determined from the amount of reactants used in the grafting process, that is, $$\left( \frac{\text{AIBN + Styrene + Raven 420}^*}{\text{Raven 420 weight in grams}} \right) \cdot (7 \text{ gram}) =$$

amount of carbon black mixture used (2) The Emulsification of the Organic Phase in the Aqueous Phase The refrigerated 500 milliliters of 0.5 percent PVA solution was poured into a quart stainless steel blender jar fitted with a Polytron mixing head. The organic phase was removed from the shaker and also added to the blender jar. The emulsification was carried out at an 87 V volts variac setting (giving a blender shaft speed of about 7,600 revolutions per minute without a load) for sixty seconds.

(3) Polymerization of the Aqueous Monomer Dispersion

Polymerization was accomplished in a one liter three neck round bottom flask fitted with a Heller stirring motor, and controller with a Teflon paddle blade stirrer. The remaining two flask necks were closed with glass stoppers. The stoppers were inserted loosely with a small amount of lubricant to minimize contamination of the reactants with stopcock grease, and to allow pressure release from the vessel. The flask was placed in a water bath preheated to the polymerization temperature; 84° C. for benzoyl peroxide and 70° C. for lauroyl peroxide. The introduction of unpigmented monomer into the aqueous phase was minimized by not using a condenser, and by immersion of the flask into the water bath to within one inch of the top of the flask necks.

Immediately after emulsification, the aqueous monomer dispersion was poured into this preheated flask and stirring was started. The stirring speed throughout the polymerization was 100–120 revolutions per minute. Afer one hour from the start of polymerization, the stirring rate was increased to 150 revolutions per minute for 15 seconds while 75 milliliters of 5 percent PVA was added (resulting in a total of 1.09 percent PVA by weight based on water). This second addition of PVA was used to prevent coalescence and/or agglomeration of the organic dispersion as the organic phase polymerized through a tacky state. At two hours reaction time, the polymerization temperature was increased to 75° C. in the polymerizations using lauroyl peroxide as the initiator. The increase in temperature was used to increase the radical concentration in order to obtain full conversion. Polymerizations initiated by benzoyl peroxide were carried out at 84° C. Samples were removed periodically from the polymerization to follow the conversion of monomer to polymer with polymerization time.

(4) Recovery of Dispersion Polymerized Toner

At the end of the polymerization (up to 7 hours reaction time), the flask was removed from the bath and the contents were quenched into 3 liters of deionized water.

After settling overnight, the supernatent was poured off and the polymer particles were washed with deionized water, and dried.

The effect of polystyrene carbon black grafting on the dispersion polymerization reaction using a 58/42 styrene/n-butyl methacrylate copolymer resin was as follows:

|  | Non-Grafted Raven 420 Carbon Black | Poly styrene Grafted on Raven 420 Carbon Black with 1% AIBN | Poly styrene Grafted on Raven 420 Carbon Black with 2% AIBN | Polystyrene Grafted on Raven 420 Carbon Black with 4% AIBN |
|---|---|---|---|---|
| No Carbon Black | | | | |
| With 7 percent lauroyl peroxide initiation in dispersion polymerization | | | | |
| *77%/ 3 hr. | 59%/ 3 hr. | 88%/ 3 hr. | 83%/ 3 hr. | 77%/3 hr. |
| 99.5%/ 5 hr. | 98%/ 7 hr. | >99.5%/ 5 hr. | 99%/ 5 hr. | 99%/ 5 hr. |

| With 3% Benzoyl Peroxide Initiation in Dispersion Polymerization Polystyrene grafted with 1% AIBN | | |
|---|---|---|
| 99.8%/ 4 hr. | 57%/ 7 hr. | 97%/ 5 hr. |

*Indicates weight percent of monomer converted to polymer in hours of polymerization time, for example 77 percent of monomer polymerized in 3 hours.

EXAMPLE II

The procedure of Example I was repeated with the exception that there was grafted on the Raven 420 carbon black a 95/5 sytrene/n-butyl methacrylate copolymer resin. The crushed grafted carbon black was heated in an oven at 79° C. for 12-14 hours, to assure that any residual AIBN initiator used in the grafting process was decomposed prior to dispersion polymerization. There resuled the following:

|  | Non-Grafted Raven 420 Carbon Black | Styrene/ n-butyl meth- acrylate copolymer 95/5, grafted on Raven 420 carbon black with 1.6% AIBN | Styrene/ n-butyl meth- acrylate copolymer 95/5, grafted on Raven 420 carbon black with 7% AIBN | Styrene/ n-butyl meth- acrylate copolymer 95/5 grafted on Raven 420 carbon black with 13% AIBN |
|---|---|---|---|---|
| No Carbon Black | | | | |
| With 5% Lauroyl Peroxide in Dispersion Polymerization | | | | |
| *99.2%/ 5 hr. | 80%/ 5 hr. | | | 97%/5 hr. |
| 99.3%/ 7 hr. | 96%/ 7 hr. | | | 98%/7 hr. |
| With 7% Lauroyl Peroxide Initiation in Dispersion Polymerization | | | | |
| 99.3%/ 4 hr. | 80.9%/ 4 hr. | 88%/ 4 hr. | | 96%/4 hr. |
| >99.5%/ 5 hr. | 96.5%/ 5 hr. | 98%/ 5 hr. | | 99.2%/5 hr. |
| | 98.8%/ 7 hr. | 98.8%/ 7 hr. | | >99.5%/7 hr. |
| With 9% Lauroyl Peroxide Initiation in Dispersion Polymerization | | | | |
| 99.5%/ 4 hr. | 88%/ 4 hr. | 97%/ 4 hr. | 98%/ 4 hr. | 98.5%/4 hr. |
| >99.5%/ 5 hr. | 97.6%/ 5 hr. | 99.5%/ 5 hr. | 99.5%/ 5 hr. | 99.5%/5 hr. |
| | 98.5%/ 6 hr. | >99.5%/ 6 hr. | >99.5%/ 6 hr. | >99.5%/6 hr. |
| | 98.7%/ | | | |
| 7 Hr. | | | | |

*Indicates weight percent of monomer converted to polymer in hours of polymerization time, for example 99.2 percent of monomer polymerized in 5 hours.

As can be seen from the above results grafting of polymer on carbon black allows very high conversion of the monomer to polymer; 99.5% or greater conversion for example in dispersion polymerization. Therefore, the grafting onto the carbon black pigment allows toners to be made in the presence of carbon black with acceptable monomer levels that are 0.5% or less by weight of monomer. At high monomer levels undesirable plasticization and objectionable odors result.

Generally, dispersion polymerization initiated by AIBN are not inhibibited by carbon black. However dispersion polymerizations initiated by AIBN gave a large amount of unpigmented aqueous phase polymerization. Apparently the polymerization in the aqueous phase is due to the high aqueous solubility of the AIBN, therefore, AIBN is not a preferred free radical initiator for these polymerizations.

Although not necessary, it is preferred that a catalyst or free radical initiator may be used to promote the initiation of monomer polymerization during polymer grafting to the pigment, typical of such initiators being azo initiators, such as those described hereinbefore which result in complete polymerization without requiring high temperatures or pressures.

Dispersing of pigment-initiator containing monomer in water may be accomplished in any suitable type mixer which results in toner particles of narrow size distribution and yields a stable suspension. The mixture may be of either batch or continuous. A preferred type mixter for the process is the rotor stator type mixer such as the Polytron in which one element is stationary and the other rotates in close tolerance therewith while a liquid is drawn through apertures in the static element. The speed of rotation is generally greater than about 3,000 revolutions per minute and the shear rate is approximately $10^3$ sec$-1$. An axial turbine agitator comprises an arrangement discs and paddles is the other preferred type of mixer. The axial turbine mixers are found to form stable dispersion of narrow particle size distributions at speed ranges of about 200 to about 3,000 rotations per minute.

Other modifications of the present invention will occur to those skilled in the art upon reading of the present invention. These are intended to be included within the scope of this invention.

What is claimed is:

1. An improved process for reducing the styrene monomer concentration in toner compositions to less than 0.5 percent by weight, which comprises (1) mixing from about 20 percent to about 99 percent by weight of styrene and n-butylmethacrylate monomers containing from about 0.5 percent to about 20 weight percent of a free radical initiator, with from about 1 percent to about 80 percent of pigment, (2) heating the resultant mixture to a temperature of about 50° C. to about 120° C., such heating being accomplished for a sufficient period of time so as to cause polymerization, (3) cooling to room temperature, and (4) separating the styrene/n-butylmethacrylate copolymer pigment mixture from the reaction residue, which mixture contains on the pigment surface said styrene/n-butylmethacrylate copolymer.

2. A process in accordance with claim 1 wherein the initiator is lauroyl peroxide, or benzoyl peroxide.

3. A process in accordance with claim 1 wherein the initiator is 2,2'-azo-bis-2-methylpropionitrile.

4. A process in accordance with claim 1 wherein the styrene/n-butylmethacrylate is comprised of 58 percent by weight styrene, and 42 percent by weight of methacrylate.

* * * * *